United States Patent [19]

Payot

[11] 3,997,253

[45] Dec. 14, 1976

[54] SELF CONTAINED FILM STRIP DISPLAY APPARATUS

[75] Inventor: Henri M. Payot, Sarasota, Fla.

[73] Assignee: Lawrence Peska Associates, Inc., New York, N.Y. ; a part interest

[22] Filed: Mar. 24, 1975

[21] Appl. No.: 561,380

[52] U.S. Cl. .................. 352/72; 352/104; 353/47

[51] Int. Cl.² ........................ G03B 21/10

[58] Field of Search ............ 352/72, 78, 104, 129; 353/47, 50

[56] References Cited

UNITED STATES PATENTS

| | | | |
|---|---|---|---|
| 2,322,023 | 6/1943 | Hopkins | 352/104 |
| 2,624,232 | 1/1953 | Kingston | 352/72 |
| 3,375,055 | 3/1968 | Hughes | 352/72 |
| 3,475,087 | 10/1969 | Busch | 352/104 |
| 3,702,726 | 11/1972 | Takeichi et al. | 352/72 |

Primary Examiner—L. T. Hix
Assistant Examiner—Alan Mathews

[57] ABSTRACT

Display apparatus for viewing a film strip which includes a cartridge having two separate reels for holding film strip for and after it passes a projection mechanism. The projection mechanism includes a light source and two prisms and a screen for viewing.

1 Claim, 5 Drawing Figures

SELF CONTAINED FILM STRIP DISPLAY APPARATUS

BACKGROUND OF THE INVENTION

The invention relates to apparatus for viewing a film strip and particularly to apparatus which projects an image on the rear of the screen for viewing on the front. Apparatus of this general type is shown in Busch, U.S. Pat. No. 3,475,087. The apparatus therein is relatively complex and bulky because of the reliance on existing projectors with conventional reel to reel transfer mechanisms and mirrors for projecting the image so produced. Other apparatus having a general relationship to the apparatus therein is shown in the following U.S. Pat. Nos. 3,284,155; 3,464,765; 3,563,642 and 3,592,537.

It is the primary object of the invention to provide apparatus which may be utilized with a minimum of difficulty and particularly eliminates the necessity for the threading operation associated with reel to reel transfer mechanisms.

Still another object of the invention is to provide apparatus which is self-contained and which utilizes a minimum of space.

SUMMARY OF THE INVENTION

It has now been found that these and other objects of the invention may be attained in a self-contained display system for a film strip having successive images disposed at axially spaced points which comprises a cartridge comprising first and second reels. Each of the reels is carried for rotation about the axis thereof. Drive means are provided for urging the associated film from the first reel to the second reel and each reel includes coupling means for cooperation wth the drive means. A light source is disposed proximate to the drive means intermediate the first and second reels and first and second prisms are provided for directing an image projected by the light source in the film strip. A transluscent screen is provided for receiving the image from the second prism and the film strip light source first and second prisms and screens are arranged to project an image from the film strip to the screen.

BRIEF DESCRIPTION OF THE DRAWING

The invention will be better understood by reference to the accompanying drawing in which.

DESCRIPTION OF THE PREFERRED EMBODIMENT

Figure 1:
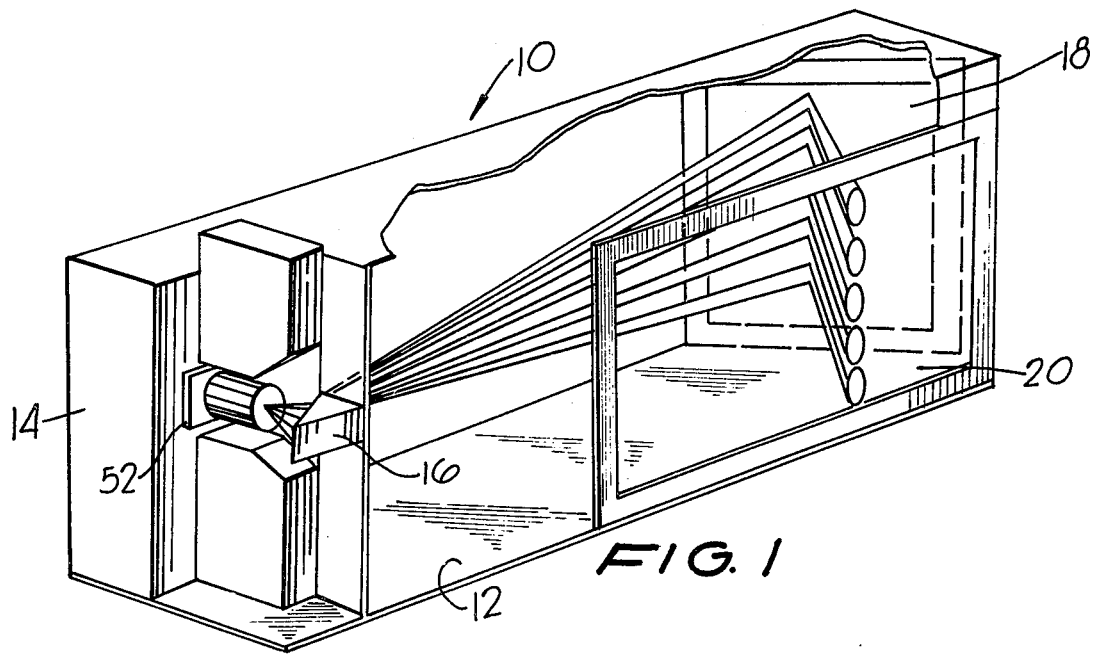
FIG. 1 is a broken away perspective view of the apparatus in accordance with the invention.

Referring to FIGS. 1 through 5 there is shown the display apparatus 10 in accordance with the invention. The apparatus 10 includes a housing 12 which carries projection apparatus 14, first prism 16 and second prism 18. A screen 20 receives an image from the second prism 18 which in turn receives the image from the first prism 16. The projection apparatus 14 of course initially directs an image from a film strip onto the first prism 16. Projection apparatus 14 includes a cartridge indicated generally by the numeral 30 which carries first and second reels 32, 34 for rotation about the axis thereof. A major advantage of a cartridge of this type is that it eliminates a substantial amount of the nuisance associated with threading a projector. Although self-threading projectors have been marketed the convenience associated therewith is not the same as the use of a cartridge loading mechanism of this type.

Figures 2, 3, 4:
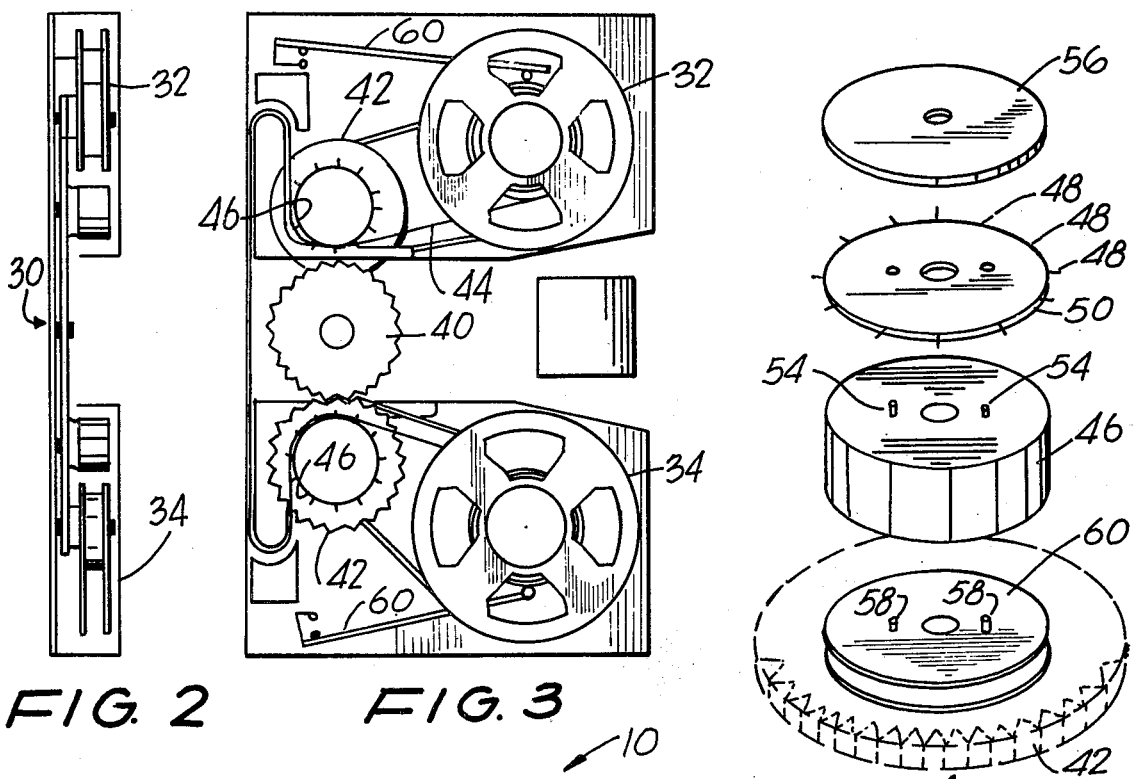
FIG. 2 is an elevational view of the film cartridge utilized in the transfer mechanism for the film.
FIG. 3 is an elevational view of the transfer mechanism shown in conjunction with a portion of the cartridge illustrated in FIG. 2.
FIG. 4 is a view in exploded relationship of the drive mechanism included in FIG. 3.
Figure 5:
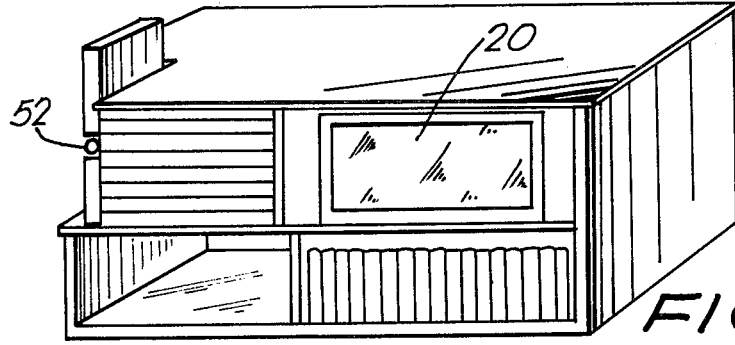
FIG. 5 is another perspective view of the apparatus in accordance with the invention.

Referring particularly to FIGS. 3 and 4 the drive mechanism in accordance with the invention will be better seen which includes a central gear 40 which is powered by means of a motor (not shown). The gear 40 engages two gears 42 disposed above and below gear 40. The film strip 44 rides on a drum 46 in passing from one reel to the other. Fingers 48 extending radially from disc 50 engage holes along one edge of the film strip 44 to position it longitudinally with respect to a lens in lens assembly 52. A pin 54 extends from the drum 46 into disc 50 to prevent relative angular movement therebetween. A second disc 56 is secured on the end of the drive assembly which also includes pins 58 extending from the boss 60 on gear 42. The pins 58, 58 engage holes (not shown) in drum 46. Spring biased bars 60 are provided to maintain coils of film strips on each reel 32, 34.

It will be seen that the apparatus so described provides for the simple loading and easy display of a film strip without the complications inherent in using conventional projector systems or even the prior art apparatus referred to above.

Having thus described my invention, I claim:

1. A self contained display system comprising a film cartridge and a projection mechanism for receiving said film cartridge; said film cartridge comprising: a cartridge body comprising first and second fixedly spaced apart sections defining a projection window therebetween; a perforated film strip in said cartridge body; supply and takeup reels for said film strip respectively mounted for rotation in said first and second sections; first and second drums carried for rotation respectively in said first and second sections; first belt means coupling said first drum and said supply reel for joint rotation; second belt means coupling said second drum and said takeup reel for joint rotation; said film strip being trained from said supply reel to said takeup reel by passing tangent to said first drum, across said projection window and then tangent to said second drum; fingers extending radially from said first and second drums for drivingly engaging the perforations in said film; and first and second gears respectively carried coaxially by said first and second drums; said projection mechanism comprising: a casing; a motor driven gear carried by said casing for simultaneously drivingly engaging said first and second gears of said cartridge for advancing said film strip past said projection window; light source and focussing means carried by said casing adjacent said projection window for forming an image in cooperation with said film strip; a backlightable translucent screen along one wall of said casing for receiving said image; and first and second prisms positioned in said casing for directing said image to the back of said screen.

* * * * *